(12) United States Patent
Liu

(10) Patent No.: US 12,226,704 B2
(45) Date of Patent: Feb. 18, 2025

(54) VIRTUAL OPERATION OBJECT CONTROL METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 203 days.

(21) Appl. No.: 17/672,644

(22) Filed: Feb. 15, 2022

(65) Prior Publication Data

US 2022/0168656 A1   Jun. 2, 2022

Related U.S. Application Data

(63) Continuation of application No. PCT/CN2020/127894, filed on Nov. 10, 2020.

(30) Foreign Application Priority Data

Jan. 17, 2020  (CN) .......................... 202010054309.4

(51) Int. Cl.
   - *A63F 13/55*  (2014.01)
   - *A63F 13/69*  (2014.01)
   - *A63F 13/837*  (2014.01)

(52) U.S. Cl.
   CPC ............ *A63F 13/837* (2014.09); *A63F 13/55* (2014.09); *A63F 13/69* (2014.09); *A63F 2300/8076* (2013.01)

(58) Field of Classification Search
   None
   See application file for complete search history.

(56) References Cited

U.S. PATENT DOCUMENTS

| 4,752,068 A | * | 6/1988 | Endo | ....................... A63F 13/73 |
| | | | | 463/24 |
| 2001/0046896 A1 | * | 11/2001 | Miyamoto | .......... A63F 13/5252 |
| | | | | 463/31 |

(Continued)

FOREIGN PATENT DOCUMENTS

| CN | 103717280 A | 4/2014 |
| CN | 106201266 A | 12/2016 |

(Continued)

OTHER PUBLICATIONS

Dragon Nest Vault, Apocalypse Nest Guide https://dragonnest-vault.blogspot.com/2012/01/apocalypse-nest-guide.html, Jan. 29, 2012 (Year: 2012).*

(Continued)

*Primary Examiner* — Damon J Pierce
(74) *Attorney, Agent, or Firm* — ArentFox Schiff LLP

(57) ABSTRACT

A method for virtual object control in a game application includes detecting a first virtual resource transfer operation when a distance between a first virtual object and a first virtual obstacle is less than or equal to a first predetermined distance threshold. The first virtual object is located in a first virtual region, the first virtual obstacle is in a first locked state that prevents the first virtual object from entering a second virtual region. Then, the method includes switching the first virtual obstacle from the first locked state to a first unlocked state that allows the first virtual object to enter the second virtual region based on a reduction of virtual resources from the first virtual object. Then, the method includes controlling the first virtual object to enter the second virtual region when a first control operation is detected. Apparatus and non-transitory computer-readable storage medium counterpart embodiments are contemplated.

20 Claims, 8 Drawing Sheets

(56) References Cited

U.S. PATENT DOCUMENTS

| | | | |
|---|---|---|---|
| 2004/0143852 A1* | 7/2004 | Meyers | A63F 13/822 463/43 |
| 2016/0361657 A1 | 12/2016 | Curtis et al. | |
| 2018/0353846 A1 | 12/2018 | Nowak et al. | |

FOREIGN PATENT DOCUMENTS

| | | |
|---|---|---|
| CN | 106938142 A | 7/2017 |
| CN | 108579085 A | 9/2018 |
| CN | 108920051 A | 11/2018 |
| CN | 109847353 A | 6/2019 |
| CN | 110262730 A | 9/2019 |
| CN | 111265850 A | 6/2020 |

OTHER PUBLICATIONS

YouTube video—Dragon Nest SEA—Level 50 Gladiator Apocalypse Nest (Hell Mode) Solo No Deaths https://www.youtube.com/watch?v=PE5K8aGvcTw, Oct. 2, 2012 (Year: 2012).*

Everquest II, Sea Travel!—https://forums.daybreakgames.com/eq2/index.php?threads/sea-travel.589170/, Apr. 2, 2019 (Year: 2019).*

Everquest II, Travel between continents—https://forums.daybreakgames.com/eq2/index.php?threads/travel-between-continents.383920/, Jul. 30, 2007 (Year: 2007).*

Zeldapedia—Rupee, Fandom, Nov. 18, 2019, Wayback Machine, https://web.archive.org/web/20191118150717/zelda.fandom.com/wiki/Rupee (Year: 2019).*

YouTube video, "The Legend of Zelda A Link to The Past Walkthrough Part 9 Dark Palace", Rinweapon—https://www.youtube.com/watch?v=StD5PoQuTtc, Mar. 31, 2010 (Year: 2010).*

Chinese Office Action issue in application CN202010054309.4 on Jan. 18, 2021, with concise English translation, (11 pages).

"Dragon Nest Cleric Challenges Apocalypse Nest Hell mode", http://v.17173.com/v_1_10778/MTYyNT92Mw.html , Jul. 16, 2013 (2 pages).

Japanese Office Action issued May 9, 2023 in Application No. 2022-521619, pp. 1-8.

"The Legend of Zelda: Triforce of the Gods" Cheats—Temple of Darkness, Full Text, [online], Apr. 28, 2018, Retrieved: Apr. 20, 2023, <URL: https://web.archive.org/web/20180428062450/https://i-njoy.net/zd3_07.html>.

Cheats for "The Legend of Zelda: Triforce of the Gods"—Small story, full text, [online], Apr. 28, 2018, Retrieved: Apr. 20, 2023, <URL:https://web.archive.org/web/20180418094645/https://i-njoy.net/zd3_18.html>.

International Search Report with Written Opinion issued Feb. 7, 2021 in Application No. PCT/CN2020/127894, pp. 1-19.

"[Yongine] The Legend of Zelda Triforce of the Gods 11 Temple of Darkness", Available on internet at: <https://www.youtube.com/watch?v=z87Fptxw7SY>, (Aug. 14, 2017), 1 page (Original Copy Only).

"Binding of Issac Rivers Room and Item", Navel Blog Post, Available on internet at: https://blog.naver.com/hsgf77/220182347595, (Nov. 15, 2014), 11 pages (Original Copy Only).

"Error Room is good luck or bad luck?[Issac Rebirth:#5]—The Binding of Issac Rebirth—[Taekyung]" Youtube, Available on internet at: <https://www.youtube.com/watch?v=HZ_QDJIgBjw>, (Nov. 12, 2014), 1 page (Original Copy Only).

Office Action received for Korean Patent Application No. 10-2022-7008245, mailed on Mar. 25, 2024, 13 pages (7 pages of English Translation and 6 pages of Original Document).

* cited by examiner

VIRTUAL OPERATION OBJECT CONTROL METHOD AND APPARATUS, STORAGE MEDIUM, AND ELECTRONIC DEVICE

RELATED APPLICATIONS

This application is a continuation of International Application No. PCT/CN2020/127894, entitled "VIRTUAL OPERATION OBJECT CONTROL METHOD AND APPARATUS, STORAGE MEDIUM, AND ELECTRONIC DEVICE" and filed on Nov. 10, 2020, which claims priority to Chinese Patent Application No. 202010054309.4 filed on Jan. 17, 2020. The entire disclosures of the prior applications are hereby incorporated by reference in their entirety.

FIELD OF THE TECHNOLOGY

This disclosure relates to the field of computers, including a virtual operation object control method and an apparatus, a storage medium, and an electronic device.

BACKGROUND OF THE DISCLOSURE

Currently, in most games, a game is played by killing monsters and passing levels, that is, a clearance mode. As long as completing a game task in a current level, a player can enter a next level, and this clearance mode is often irreversible. To enrich game content, many different gameplay modes are often provided in a game application to attract more users and players to participate. In a gameplay mode, a zombie element is added to a game scene. As a casual game mode, a zombie level is deeply loved by players. In this mode, a player can only control a virtual operation object to move in line with a progress of the game, and the operation flexibility of the virtual operation object is weak, which reduces interestingness of the game.

SUMMARY

Embodiments of this disclosure provide a virtual operation object control method and an apparatus, a non-transitory computer-readable storage medium, and an electronic device, so as to at least solve a technical problem in the related art that in a game scene, the operational flexibility of a virtual operation object (also referred to as a virtual object, such as a virtual character for a player and the like) is weak, and the game is not interesting.

Some aspects of the disclosure provide a method for virtual object control in a game application performed on an electronic device. The method includes detecting a first virtual resource transfer operation when a distance between a first virtual object and a first virtual obstacle in the game application is less than or equal to a first predetermined distance threshold. The first virtual object is located in a first virtual region in the game application, the first virtual obstacle is in a first locked state that prevents the first virtual object from entering a second virtual region in the game application. In response to the first virtual resource transfer operation, the method includes switching the first virtual obstacle from the first locked state to a first unlocked state that allows the first virtual object to enter the second virtual region based on a reduction of a first predetermined quantity of virtual resources from a virtual resource set possessed by the first virtual object. Then, the method includes controlling the first virtual object to move from the first virtual region into the second virtual region when a first control operation is detected.

Some aspects of the disclosure provide an apparatus for performing a game application. The apparatus includes processing circuitry that is configured to detect a first virtual resource transfer operation when a distance between a first virtual object and a first virtual obstacle in the game application is less than or equal to a first predetermined distance threshold. The first virtual object is located in a first virtual region in the game application, the first virtual obstacle is in a first locked state that prevents the first virtual object from entering a second virtual region in the game application. In response to the first virtual resource transfer operation, the processing circuitry switches the first virtual obstacle from the first locked state to a first unlocked state that allows the first virtual object to enter the second virtual region based on a reduction of a first predetermined quantity of virtual resources from a virtual resource set possessed by the first virtual object. Then, the processing circuitry can control the first virtual object to move from the first virtual region into the second virtual region when a first control operation is detected.

Some aspects of the disclosure also provide a non-transitory computer-readable medium that stores instructions for a game application. The instructions can be executed by a computer and cause the computer to perform the method for virtual object control in the game application.

Through the above technical solutions, by setting virtual obstacles and virtual regions, and unlocking virtual obstacles by transferring virtual resources, not only the virtual obstacles have different states, but also the virtual operation object has different corresponding operation control permissions in different states of the virtual object, so that the flexibility and diversity of the virtual operation object is improved, and interestingness of the game is increased.

BRIEF DESCRIPTION OF THE DRAWINGS

The accompanying drawings described herein are used for providing a further understanding of this disclosure, and form part of this disclosure. Exemplary embodiments of this disclosure and descriptions thereof are used for explaining this disclosure, and do not constitute any inappropriate limitation to this disclosure. In the accompanying drawings.

DESCRIPTION OF EMBODIMENTS

The following describes the technical solutions in the embodiments of this disclosure with reference to the accompanying drawings in the embodiments of this disclosure. The described embodiments are some of the embodiments of this disclosure.

In this specification, claims, and accompanying drawings of this disclosure, the terms "first", "second", and so on are intended to distinguish similar objects but do not necessarily indicate a specific order or sequence. It is to be understood that the data termed in such a way are interchangeable in proper circumstances, so that the embodiments of this disclosure described herein can be implemented in orders other than the order illustrated or described herein. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

Technical terms involved in embodiments of this disclosure include the following:

(1) Mobile terminal: The mobile terminal generally refers to a mobile phone, including but not limited to all hand-held portable game devices.

(2) Shooting games: The shooting games include, but are not limited to, all games that use hot weapons for long-range attack, such as first-person shooting games and third-person shooting games.

Figure 1:
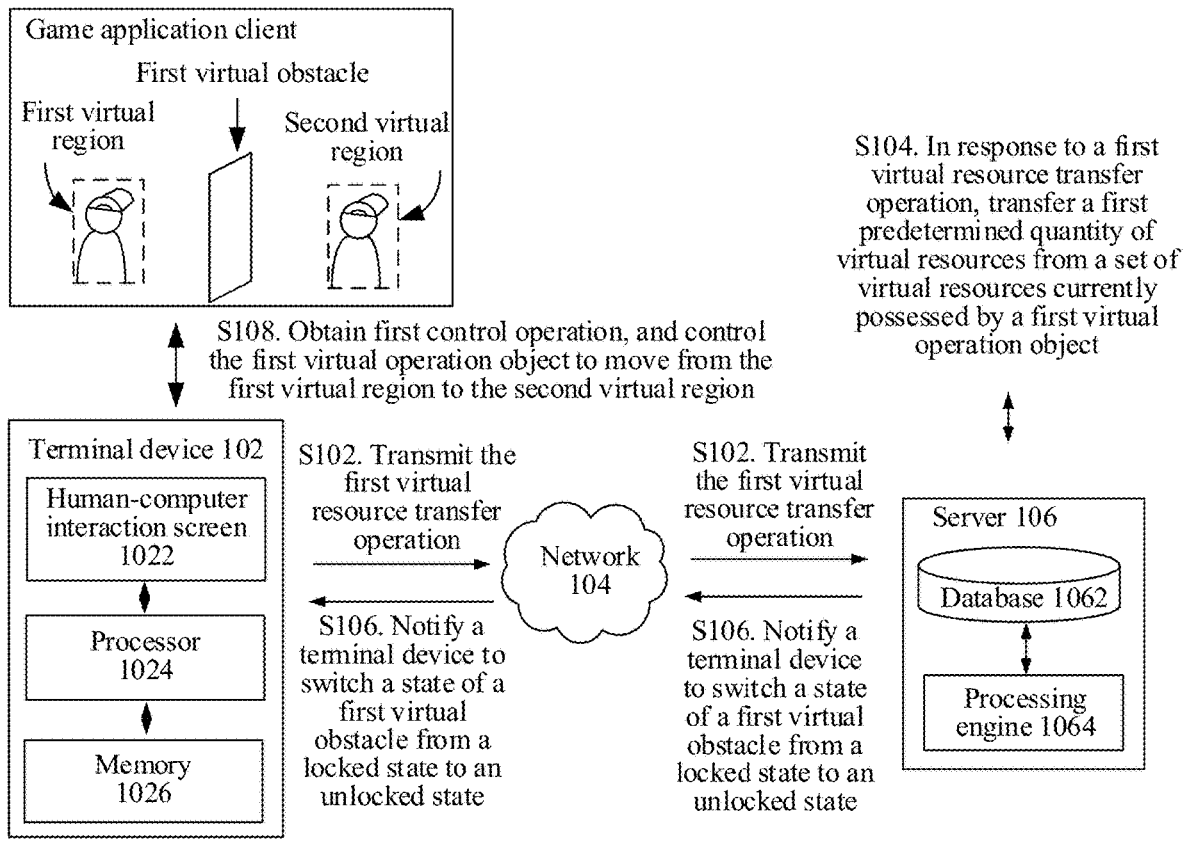
FIG. 1 is a schematic diagram of an application environment of a virtual operation object control method according to an embodiment of this disclosure.

According to an aspect of the embodiments of this disclosure, a virtual operation object control method is provided. In an implementation, the foregoing virtual operation object control method may be applicable to, but is not limited to, an environment shown in FIG. 1. The virtual operation object control method may be applicable to, but not limited to, a virtual operation object control system in an environment shown in FIG. 1. The virtual object control system may include but not limited to a terminal device 102, a network 104, and a server 106. The terminal device 102 runs a game application client that allows a target user account to log in. The terminal device 102 includes a human-computer interaction screen 1022, a processor 1024, and a memory 1026. The human-computer interaction screen 1022 is configured to present a virtual scene in a game task run by the above-mentioned game application client, and is further configured to provide a human-computer interaction interface to receive human-computer interaction operation performed on a human-computer interaction interface, and to display a control scene of the virtual operation object; and the processor 1024 is configured to obtain a first virtual resource transfer operation, a first virtual operation object (also referred to as first virtual object) being located in a first virtual region in a target game application, a first virtual obstacle being in a locked state, the first virtual obstacle being set to prevent the first virtual operation object from moving to a second virtual region in the target game application when the first virtual obstacle is in the locked state, and a first virtual resource transfer operation being configured to transfer a first predetermined quantity of virtual resources from a virtual resource set currently possessed by the first virtual operation object, and control the first virtual operation object to move from the first virtual region to the second virtual region when a first control operation is obtained. The memory 108 is configured to store the quantity of the virtual resources currently possessed by the first virtual operation object controlled by the above-mentioned game application client, and the first predetermined quantity of the virtual resources that need to be transferred in response to the first virtual resource transfer operation.

In addition, the server 106 includes a database 1062 and a processing engine 1064, where the database 1062 is configured to store the first virtual obstacle and other virtual objects (not shown in the figure) that have been placed in the game task. The processing engine 1064 is configured to, in response to the first virtual resource transfer operation, transfer the first predetermined quantity of the virtual resources from the virtual resource set currently possessed by the first virtual operation object, and notify the terminal device 102 to switch a state of the first virtual obstacle from the locked state to an unlocked state.

An implementation process is shown in the following steps. In step S102, a touch operation is triggered on the human-computer interaction screen 1022 in the terminal device 102, and the first virtual resource transfer operation of the above touch operation is obtained and sent to the server 106 through the network 104. In step S104, the server 106 is configured to, in response to the first virtual resource transfer operation, transfer the first predetermined quantity of the virtual resources from the virtual resource set currently possessed by the first virtual operation object. In step S106, the server 106 is then configured to notify, through the network 104, the terminal device 102 to switch the state of the first virtual obstacle from the locked state to the unlocked state. The touch operation is triggered on the human-computer interaction screen 1022 in the terminal device 102, then the first control operation of the above touch operation is obtained, and the first virtual operation object is controlled to move from the first virtual region to the second virtual region.

In an embodiment of this disclosure, the above-mentioned virtual operation object control method can be but not limited to be applicable to a terminal device, where the terminal device can be, but is not limited to, a mobile phone, a tablet computer, a notebook computer, a personal computer (PC) and other terminal devices that support running of an application client. The server and the terminal device may perform, but not limited to, data exchange with each other through a network, and the network may include, but is not limited to, a wireless network or a wired network. The wireless network includes: Bluetooth, Wi-Fi, and other networks implementing wireless communication. The wired network may include, but is not limited to: a wide area network, a metropolitan area network, and a local area network. The server may be an independent physical server, or may be a server cluster composed of a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The foregoing description is merely an example, which is not limited in the embodiments of this disclosure.

Figure 2:
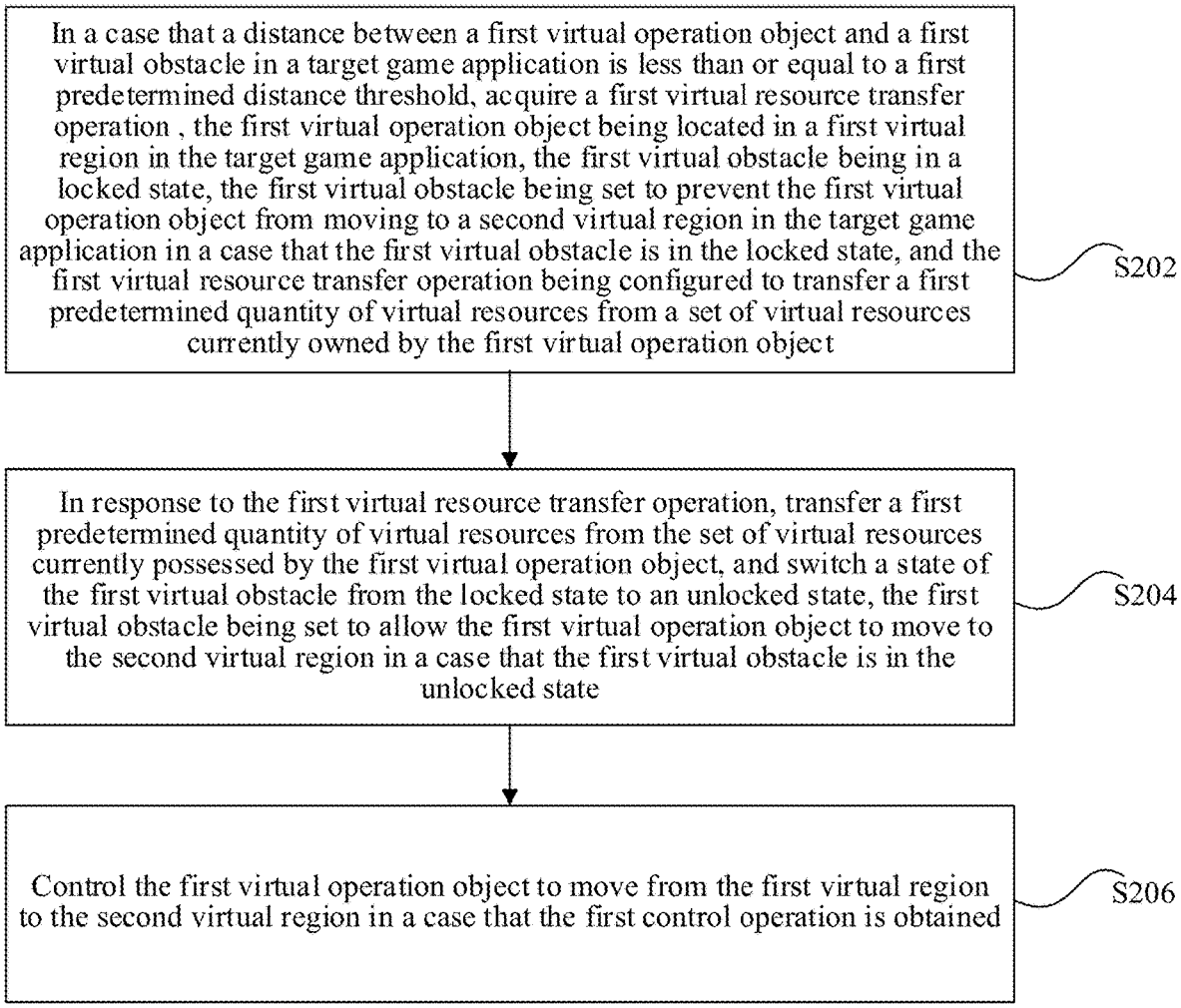
FIG. 2 is a schematic flowchart of a virtual operation object control method according to an embodiment of this disclosure.

In an embodiment of this disclosure, in an implementation, the method may be performed by a server or a terminal device, or may be performed by a server and a terminal device jointly. In an embodiment of this disclosure, take the execution by a terminal device (for example, the terminal device 102) as an example for description. As shown in FIG. 2, a process of a virtual operation object control method may include the following steps:

In step S202, when a distance between a first virtual operation object and a first virtual obstacle in a target game application is less than or equal to a first predetermined distance threshold, a first virtual resource transfer operation is obtained.

The first virtual operation object is located in a first virtual region in a target game application, the first virtual obstacle is in a locked state, the first virtual obstacle is set to prevent the first virtual operation object from moving to a second virtual region in the target game application when the first virtual obstacle is in the locked state, and a first virtual resource transfer operation is configured to transfer a first predetermined quantity of virtual resources from a virtual resource set currently possessed by the first virtual operation object.

In step S204, in response to the first virtual resource transfer operation, the first predetermined quantity of the virtual resources are transferred from the virtual resource set currently possessed by the first virtual operation object, and switch a state of the first virtual obstacle from the locked state to an unlocked state.

The first virtual obstacle is set to allow the first virtual operation object to move to the second virtual region when the first virtual obstacle is in the unlocked state.

In step S206, the first virtual operation object is controlled to move from the first virtual region to the second virtual region when the first control operation is obtained.

In an embodiment of this disclosure, the virtual operation object control method is applicable to, but is not limited to, a game application, such as a shooting game application. In a process of running a gameplay mode of a shooting game, game players participating in the shooting gameplay mode may be divided into a camp. Players of one camp cooperate to kill a virtual operation object of a target type of an opponent in the gameplay mode. In some embodiments, the game players participating in the shooting gameplay mode may also be divided into a plurality of camps. The players of one camp cooperate to kill the players of other camps and the virtual operation object of the target type of the opponent in the gameplay mode.

In an embodiment of this disclosure, the game application may be a multiplayer online battle arena (MOBA) game application or may further be a single-player game (SPG) application. The game application may include, but is not limited to, at least one of the following: a two-dimensional (2D) game application, a three-dimensional (3D) game application, a virtual reality (VR) game application, an augmented reality (AR for short) game application, and a mixed reality (MR) game application. The foregoing is merely an example, and the embodiments of this disclosure are not limited thereto.

In some embodiments, the first virtual operation object may be, but is not limited to, a player operation object. The first virtual resource transfer operation may include, but is not limited to, detection of a target pressing signal in a target region, where the pressing signal may include, but is not limited to, pressing identification (such as a fingerprint), pressing position, pressing duration, pressing strength, and the like.

In a game scene of the target game application, the first virtual operation object and the first virtual obstacle are included, the first virtual operation object is currently located in the first virtual region, and the first virtual operation object is not allowed to move from the first virtual region to the second virtual region when the first virtual obstacle is in the locked state. During the movement of the first virtual operation object, when the distance between the first virtual operation object and the first virtual obstacle is less than or equal to the first predetermined distance threshold, if the first virtual resource transfer operation is obtained, in response to the first virtual resource transfer operation, the first predetermined quantity of the virtual resources are transferred from the virtual resource set currently possessed by the first virtual operation object. In this case, the first virtual obstacle is switched from the locked state to the unlocked state, and the first virtual operation object can be controlled to move from the first virtual region to the second virtual region when the first control operation is obtained.

Through an embodiment of this disclosure, in the target game application, the first virtual operation object is located in the first virtual region, and the first virtual obstacle is set in the target game application, the first virtual operation object is set to prevent the first virtual operation object from moving to the second virtual region when the first virtual obstacle is in the locked state, and when the distance between the first virtual operation object and the first virtual obstacle is less than or equal to the first predetermined distance threshold, if the first virtual resource transfer operation is obtained, in response to the first virtual resource transfer operation, the first predetermined quantity (such as 200) of the virtual resources are transferred from the virtual resource set currently possessed by the first virtual operation object, and the state of the first virtual obstacle is switched from the locked state to the unlocked state, the first virtual obstacle being set to allow the first virtual operation object to move to the second virtual region when the first virtual obstacle is in the unlocked state; and the first virtual operation object can be controlled to move from the first virtual region to the second virtual region when the first control operation is obtained. Through the above technical solutions, by setting the virtual obstacle and the virtual region and the virtual obstacle having locked and unlocked states, state attributes of the virtual obstacle are enriched, and game players are provided with more game choices. Besides, it is necessary to transfer virtual resources to unlock the virtual obstacle, so that the virtual operation object can be controlled to move back and forth between the virtual regions when the virtual obstacle is in the unlocked state, which expands a movable region of the virtual operation object and can improve the operation flexibility and diversity of the virtual operation object.

In some embodiments, before obtaining the first virtual resource transfer operation, the method further includes: transferring a second predetermined quantity (such as 100, 500, etc.) of virtual resources (such as gold coins, energy, diamonds, coupons, etc.) to the first virtual operation object when the first virtual operation object performs an attack operation on the virtual operation object of the target type;

when the distance between the first virtual operation object and the first virtual obstacle is less than or equal to the first predetermined distance threshold, displaying a virtual identifier of the first virtual obstacle; and correspondingly, the obtaining the first virtual resource transfer operation including: obtaining a touch operation performed on the virtual identifier, where the first virtual resource transfer operation includes the touch operation.

The above-mentioned virtual operation object of the target type is a virtual operation object controlled by a target shooting application program. The virtual operation object of the target type can be, but is not limited to, a player operation object or a non-player operation object, such as a zombie set in a game.

In some embodiments, in a game scene, when the first virtual operation object performs an attack operation on the virtual operation object of the target type, and the virtual operation object of the target type is hit or killed by the attack operation, the level, life value, defense power, attack power, speed, etc. of the virtual operation object of the target type can be reduced, and the second predetermined quantity of the virtual resources can be transferred to the first virtual operation object. The second predetermined quantity of the virtual resources can be set to different quantities according to the hitting and killing performed by the first virtual operation object. The quantity of the virtual resources obtained by killing the virtual operation object of the target type is greater than the quantity of the virtual resources obtained by hitting the virtual operation object of the target type. The second predetermined quantity may also be set according to a type of the virtual operation object of the target type, for example, different second predetermined quantities are set for different types of zombies.

In a case that the distance between the first virtual operation object and the first virtual obstacle is less than or equal to the first predetermined distance threshold, the virtual identifier of the first virtual obstacle is displayed, and the touch operation performed on the virtual identifier can be obtained, and the first virtual resource transfer operation includes the touch operation.

It is to be understood that the foregoing is merely an example. This is not limited in the embodiments of this disclosure herein.

Through this embodiment, it is possible to transfer the second predetermined quantity of the virtual resources to the first virtual operation object by performing the attack operation on the virtual operation object of the target type, thereby promoting game players to kill a large quantity of the virtual operation objects of the target type to unlock different virtual regions and improve the gaming experience of the game players.

In some embodiments, when the distance between the first virtual operation object and the first virtual obstacle is less than or equal to the first predetermined distance threshold, the virtual identifier of the first virtual obstacle is displayed, comprising: displaying the virtual identifier of the first virtual obstacle when a distance between a detection frame of the first virtual operation object and a detection frame of the first virtual obstacle is less than or equal to the first predetermined distance threshold.

In some embodiments, the distance between the detection frame of the first virtual obstacle and the detection frame of the first virtual operation object can be configured to detect whether the distance between the two is less than or equal to the first predetermined distance threshold, and the virtual identifier of the first virtual obstacle may be displayed when the distance is less than or equal to the first predetermined distance threshold.

In an embodiment of this disclosure, the distance between the first virtual operation object and the first virtual obstacle is determined by the detection frame, a detection logic is simple, and the expense is reduced.

In some embodiments, after controlling the first virtual operation object to move from the first virtual region to the second virtual region, the method further comprises: maintaining a state of the first virtual obstacle as the unlocked state when the first virtual operation object is located in the second virtual region; and controlling the first virtual operation object to move from the second virtual region to the first virtual region when the state of the first virtual obstacle is the unlocked state and a second control operation is obtained.

In some embodiments, after controlling the first virtual operation object to move from the first virtual region to the second virtual region, a region where the first virtual operation object is currently located is the second virtual region. In this case, the state of the first virtual obstacle remains in the unlocked state, and if the second control operation is obtained, the first virtual operation object can be controlled to move from the second virtual region to the first virtual region. That is, the first virtual operation object can be controlled to move from the first virtual region to the second virtual region, and the first virtual operation object can also be controlled to move from the second virtual region to the first virtual region when the first virtual obstacle is in the unlocked state.

Through an embodiment of this disclosure, in a game scene, different from a clearance mode, through the above method, the first virtual operation object can be moved back and forth in each virtual region when the virtual obstacle is in the unlocked state, which increases a movable range of the virtual operation object, thereby making the game more interesting.

In some embodiments, after controlling the first virtual operation object to move from the first virtual region to the second virtual region, the method may further comprise: switching the first virtual obstacle from the unlocked state to the locked state when the first virtual operation object moves from the first virtual region to the second virtual region; obtaining the second virtual resource transfer operation when the distance between the first virtual operation object and the first virtual obstacle is less than or equal to the first predetermined distance threshold, the first virtual operation object being located in the second virtual region, and the second virtual resource transfer operation being configured to transfer a third predetermined quantity of virtual resources from the virtual resource set currently possessed by the first virtual operation object; in response to the second virtual resource transfer operation, transferring a third predetermined quantity of virtual resources from the virtual resource set currently possessed by the first virtual operation object, and switching the state of the first virtual obstacle from the locked state to the unlocked state; and controlling the first virtual operation object to move from the second virtual region to the first virtual region when the third control operation is obtained.

In some embodiments, after controlling the first virtual operation object to move from the first virtual region to the second virtual region, the region where the first virtual operation object is currently located is the second virtual region. The first virtual obstacle can be switched from the unlocked state to the locked state, and then, when the distance between the first virtual operation object and the first virtual obstacle is less than or equal to the first predetermined distance threshold, and the second virtual resource transfer operation is obtained, in response to the second virtual resource transfer operation, the third predetermined quantity (such as 200) of the virtual resources can be transferred from the virtual resource set currently possessed by the first virtual operation object, and the state of the first virtual obstacle is switched from the locked state to the unlocked state. The first virtual operation object is controlled to move from the second virtual region to the first virtual region when the third control operation is obtained. That is, the first virtual operation object can be controlled to move from the first virtual region to the second virtual region when the first virtual obstacle is in the unlocked state. In this case, the first virtual obstacle is switched from the unlocked state to the locked state. In a case that a player wants to move the first virtual operation object from the second virtual region back to the first virtual region, a virtual asset transfer operation needs to be triggered again. In a case that the second virtual resource transfer operation is obtained, in response to the second virtual resource transfer operation, the third predetermined quantity (such as 200) of the virtual resources are transferred from the virtual resource set currently owned by the first virtual operation object, so that the first virtual obstacle is in the unlocked state again, and then the first virtual operation object can be controlled to move from the second virtual region to the first virtual region. The third predetermined quantity may be less than or equal to the first predetermined quantity.

Through an embodiment of this disclosure, the state of the first virtual obstacle can be flexibly controlled, so that the first virtual operation object needs to transfer virtual resources every time the first virtual operation object passes the first virtual obstacle, which can provide players with more game choices and make the game more appealing.

In some embodiments, after controlling the first virtual operation object to move from the first virtual region to the second virtual region, the method may further comprise: obtaining the third virtual resource transfer operation when the first virtual operation object is located in the second virtual region, and a distance between the first virtual operation object and the second virtual obstacle is less than or equal to the second predetermined distance threshold, the second virtual obstacle being in a locked state, and the second virtual obstacle being set to prevent the first virtual operation object from moving to a third virtual region in the target game application when the second virtual obstacle is in the locked state, and the third virtual resource transfer operation is configured to transfer a fourth predetermined quantity of virtual resources from the set of virtual resource currently possessed by the first virtual operation object; in response to the third virtual resource transfer operation, transferring the fourth predetermined quantity of virtual resources from the virtual resource set currently possessed by the first virtual operation object, and switching the state of the second virtual obstacle from the locked state to an unlocked state, the second virtual obstacle being set to allow the first virtual operation object to move to the third virtual region when the second virtual obstacle is in the unlocked state, and the first predetermined quantity being different from the fourth predetermined quantity; and when the fourth control operation is obtained, the first virtual operation object is controlled to move from the second virtual region to the third virtual region.

In some embodiments, in a game scene of the target game application, the first virtual operation object and the second virtual obstacle are included, where the first virtual operation object is currently located in the second virtual region, and the first virtual operation object is not allowed to move from the second virtual region to the third virtual region when the second virtual obstacle is in the locked state. During the movement of the first virtual operation object, when the distance between the first virtual operation object and the second virtual obstacle is less than or equal to the second predetermined distance threshold, if the third virtual resource transfer operation is obtained, in response to the third virtual resource transfer operation, the fourth predetermined quantity (such as 400) of virtual resources are transferred from the virtual resource set currently possessed by the first virtual operation object (the fourth predetermined quantity is different from the first predetermined quantity). In this case, the second virtual obstacle is switched from the locked state to the unlocked state, and when the fourth control operation is obtained, the first virtual operation object can be controlled to move from the second virtual region to the third virtual region.

Through an embodiment of this disclosure, the virtual resource required to unlock different virtual obstacles can be different. In this way, a game player can be motivated to hit or kill zombies in large quantities and obtain the virtual resource to move to different virtual regions, which mobilizes the player's enthusiasm for the game, and increasing the competitiveness and interestingness of the game.

In some embodiments, the first virtual obstacle and the second virtual obstacle are different virtual obstacles.

In some embodiments, the first virtual obstacle and the second virtual obstacle can be different obstacles, and each virtual obstacle can be adapted to a current region. For example, a current virtual region is a clutter room and the virtual obstacle can be set as a clutter cabinet, a current game scene is a factory and the virtual obstacle can be set as an industrial pipeline, and the like. It is to be understood that the foregoing is merely an example, which is not limited herein.

Through this embodiment, different virtual obstacles can be set according to different virtual regions, which increases a visual sense of the game and improves the game experience.

Figure 3:
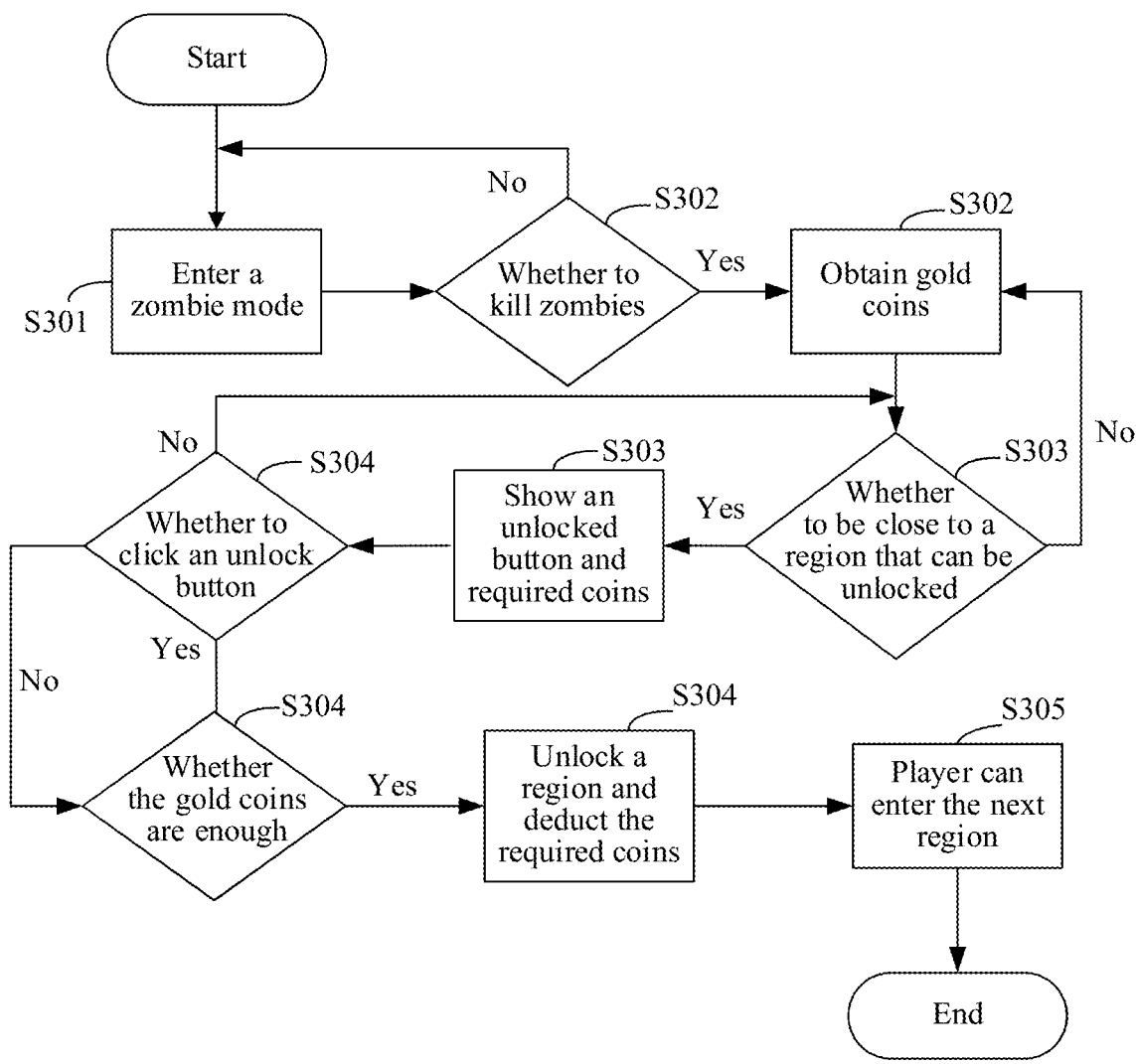
FIG. 3 is another schematic flowchart of a virtual operation object control method according to an embodiment of this disclosure.

In the following, an implementation process of the virtual operation object control method is described with reference to an example. As shown in FIG. 3, the method includes the following steps:

In step S301, the player (corresponding to the first virtual operation object) enters a zombie mode.

In a game scene, it can be set that a region unlock is available only in the zombie mode.

Figure 4:
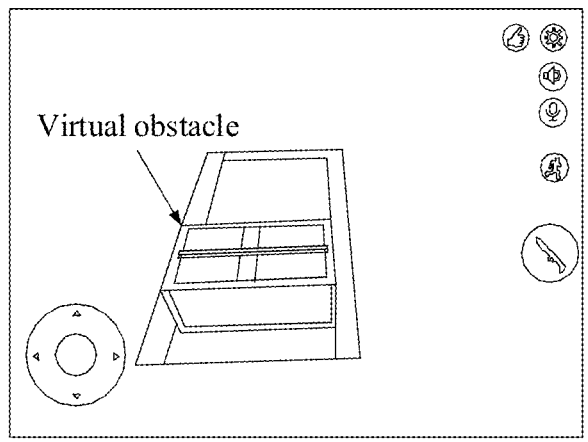
FIG. 4 is a schematic diagram of a virtual obstacle according to an embodiment of this disclosure.

In the zombie mode, a plurality of regions to be unlocked can be set, various virtual obstacles can be used among the plurality of regions to be unlocked to block a player from moving forward, and these virtual obstacles cannot be destroyed and are to be unlocked with gold coins. To make the game more interesting, the virtual obstacle in each place is adapted to the current region. For example, if the current region is a clutter room, an obstacle can be set as the virtual obstacle as shown in FIG. 4. It is to be understood that the virtual obstacle may be the first virtual obstacle or the second virtual obstacle, which is not limited herein.

Figure 5:
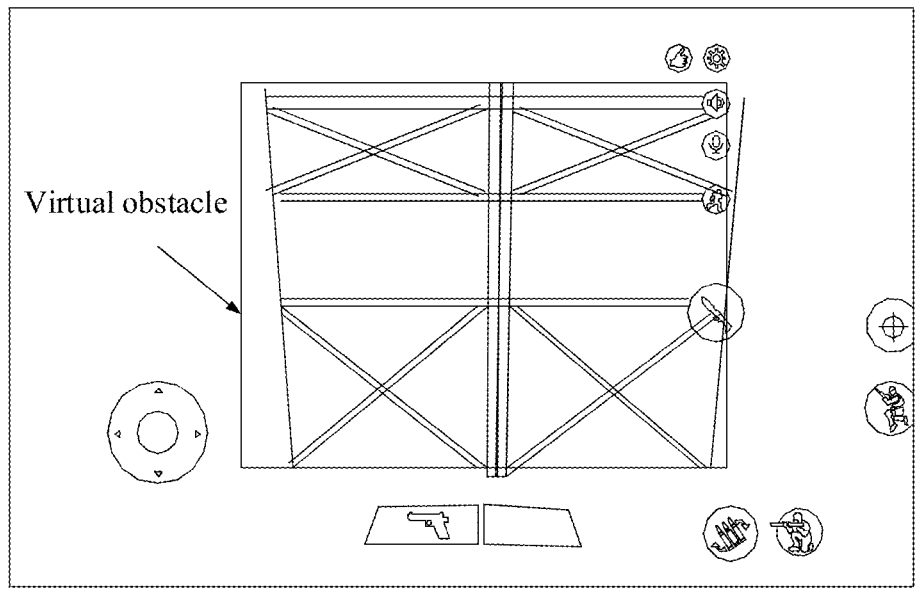
FIG. 5 is another schematic diagram of a virtual obstacle according to an embodiment of this disclosure.

The virtual obstacle is not static, and different virtual obstacles are set according to the current environment. If the virtual obstacle is a door, the virtual obstacle as shown in FIG. 5 can be displayed.

The above-mentioned zombies correspond to the above-mentioned virtual operation object of the target type. In the embodiments of this disclosure, the virtual operation object of the target type is described exemplified as the zombie, but the virtual operation object of the target type is not limited to the zombie, and may also be other types of monsters.

In step S302, in the zombie mode, the player obtains an amount of gold coins by killing or hitting the zombies.

In a case of choosing to enter the zombie mode, the player can start to kill or hit the zombies. Every time hitting or killing the zombies, the player can obtain a certain amount of gold coins, where the gold coins obtained by killing the zombies are more than the gold coins obtained by hitting the zombies.

Figure 6:
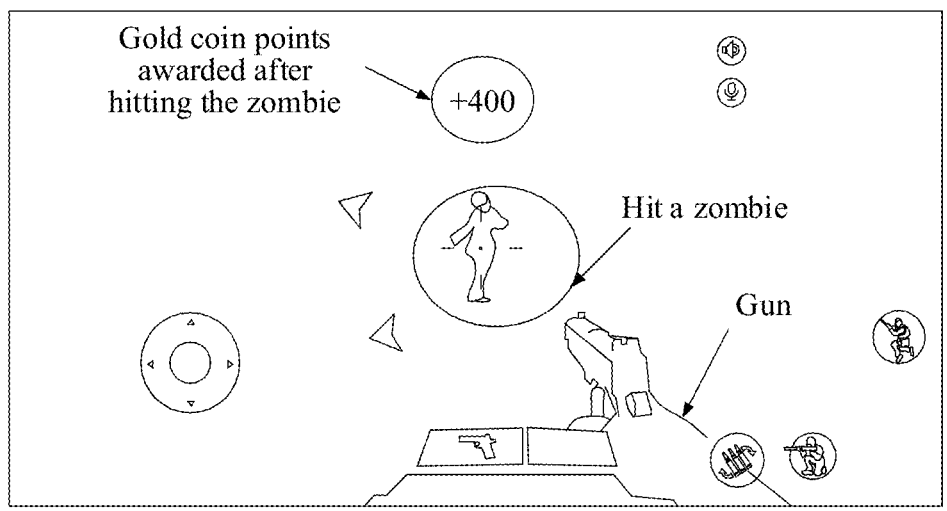
FIG. 6 is a schematic diagram of obtaining gold coins by killing zombies according to an embodiment of this disclosure.

As shown in FIG. 6, after killing the zombies, a certain amount of gold coins can be obtained, and the amount of the obtained gold coins pops up, and for example, 400 gold coins are obtained.

In step S303, an unlock button is displayed when the player moves to a position close to the virtual obstacle that can be unlocked.

Figure 7:
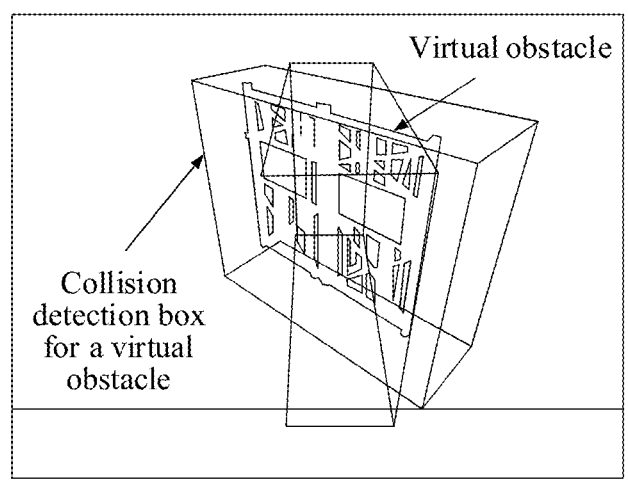
FIG. 7 is a schematic diagram of a collision detection box for a virtual obstacle according to an embodiment of this disclosure.

Only when the player moves to a position of the virtual obstacle that can be unlocked can the unlock button be displayed. Whether the virtual obstacle can be unlocked is not predictable in advance, and only when the player approaches can the player know whether the current virtual obstacle can be unlocked. In some embodiments, bounding volumes can be used to detect whether a player (with a virtual object corresponding to the player in a game scene) approaches a virtual obstacle in the game scene. In some examples, a bounding volume for an object (e.g., a virtual object, a virtual obstacle and the like) is a closed volume that contains the object. The bounding volume can have any suitable shape, such as cylindrical shape, a cuboid shape, and the like. In some examples, when a bounding volume of an object is used for collision detection, the bounding volume is referred to as a collision detection box for the object or a detection frame for the object. In an example, each virtual obstacle that can be unlocked is hung with a collision detection box, as shown in FIG. 7.

Further, a collision detection box (such as a cylindrical collision detection box) can be hung on the player. When two collision detection boxes are in contact with each other, a corresponding logic is triggered, and the logic here is to display a door open button.

In step S304, the player clicks the unlock button to unlock a region and deduct required gold coins.

During the game, the player can continuously kill the zombies to obtain the gold coins, and then use the obtained gold coins to unlock a region. After the gold coins are used up, the player kills the zombies to obtain the gold coins to unlock a new region. A protocol communication process between a client and a server in the above-mentioned whole process can be referred to FIG. 8.

Figure 8:
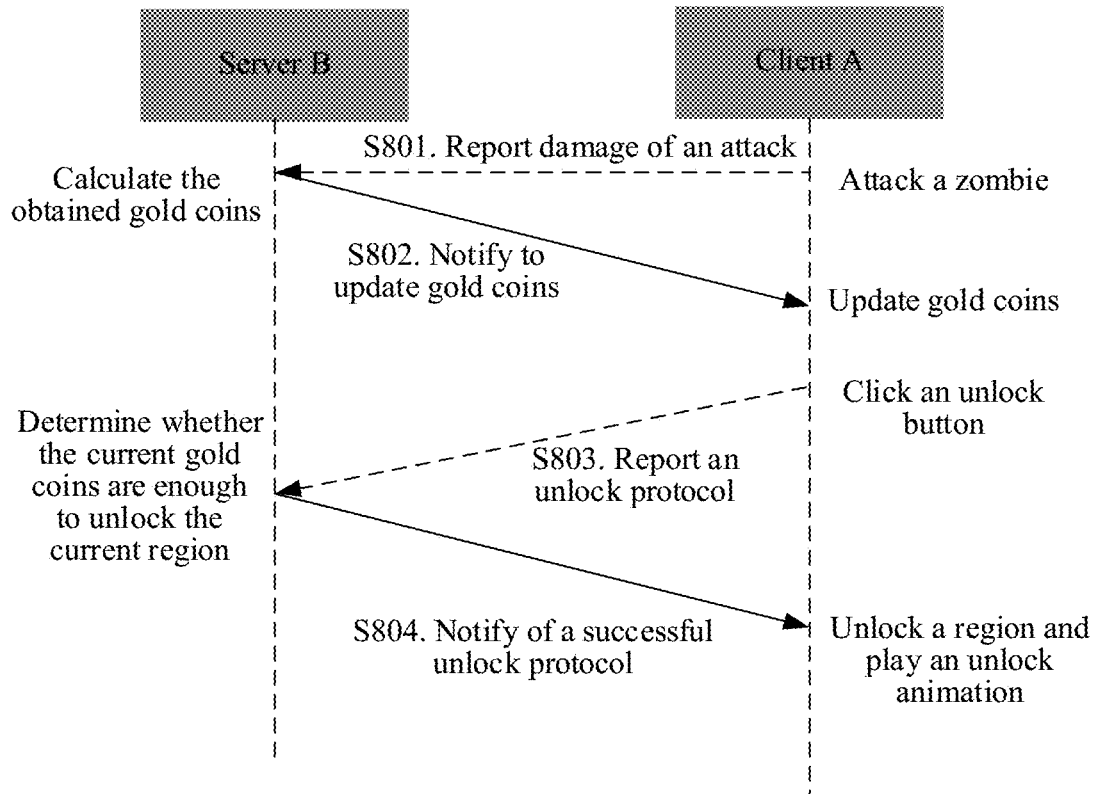
FIG. 8 is a schematic diagram of a protocol exchange process between a client and a server according to an embodiment of this disclosure.

As shown in FIG. 8, steps of the protocol communication process between the client and the server include steps S801 to S804:

In step S801, the first virtual operation object (not shown in the figure) in a client A attacks the zombies, and reports damage of the attack to the server.

In step S802, after receiving the damage from the attack reported by the client, a server B calculates the gold coins obtained by the first virtual operation object, and notifies the client A to update the amount of gold coins owned by the first virtual operation object.

In step S803, the unlock button is clicked through the client A, and an unlock protocol is reported to the server B.

In step S804, after receiving the unlocking protocol reported by the client A, the server B notifies the client A of a successful unlock protocol. After receiving the successful unlock protocol of the server B, the client A unlocks a region in the client A, and plays an unlock animation.

The player does not need to worry about not having enough gold coins to open the virtual obstacle. The zombies keep popping up, and as long as keeping killing the zombies, the player can obtain the gold coins, and the zombies do not appear in the unlocked region, only in the region unlocked by the player.

A next region can be unlocked directly, if the player has enough gold coins to unlock the next region. There is no need to kill all the zombies in a region where the player is currently located. As long as the gold coins are enough, the next region can be unlocked.

In step S305, the player is controlled to enter a new region.

Figure 9:
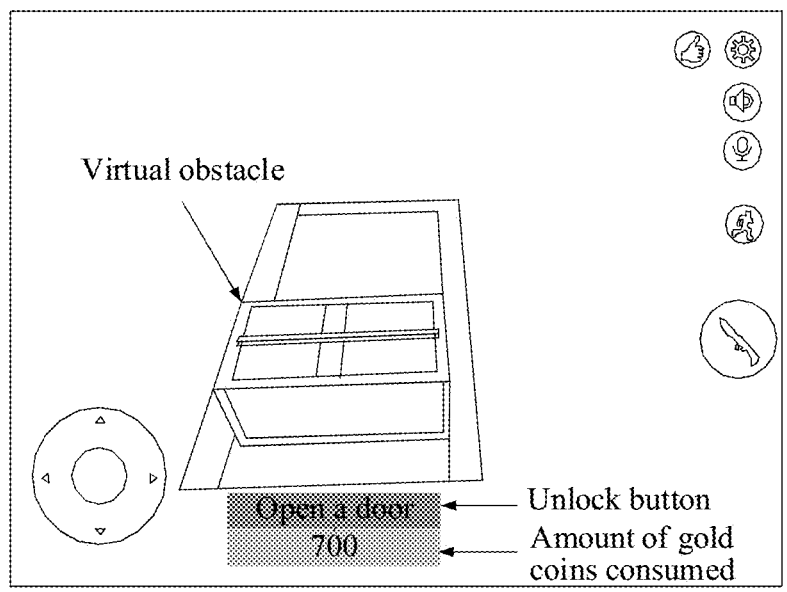
FIG. 9 is a schematic diagram of an unlock button of a virtual obstacle according to an embodiment of this disclosure.
Figure 10:
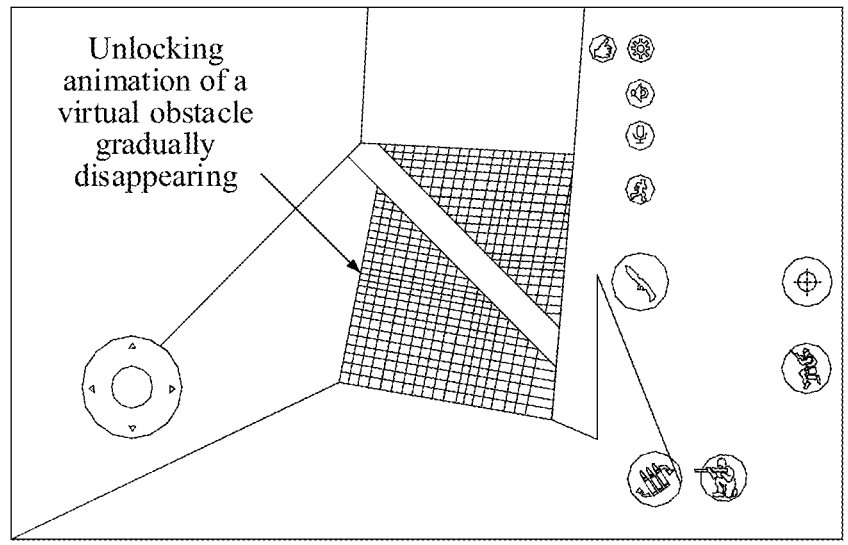
FIG. 10 is a schematic diagram of an unlocking animation according to an embodiment of this disclosure.

In a case that the player approaches the virtual obstacle, as shown in FIG. 9, an unlock button of the virtual obstacle (corresponding to the virtual identifier) is displayed. As long as the player clicks a door-opening button (that is, the unlock button) as shown in FIG. 9, the corresponding amount of gold coins is consumed (700 in FIG. 9), and the unlocking animation that the virtual obstacle gradually disappears is played, as shown in FIG. 10.

In a case that the virtual obstacle is cleared, the player can move on and enter a new region from the unlocked region.

The player can move freely in the unlocked region without restriction, and it is to be understood that the above is only an example, and the embodiments of this disclosure does not limit herein.

Through an embodiment of this disclosure, the gold coins are obtained by killing the zombies, and the region is unlocked by the gold coins. To enter more regions, the player is more active in killing the zombies, which increases the utilization of the zombie mode, and can continuously motivate the player to unlock new regions, expanding the player's operation space, and improving the player's gaming experience.

For the ease of description, the foregoing method embodiments are expressed as a series of action combinations, but a person skilled in the art is to learn that because some steps may be performed in other sequences or simultaneously according to the embodiments of this disclosure, the embodiments of this disclosure are not limited to the described action sequence.

Figure 11:
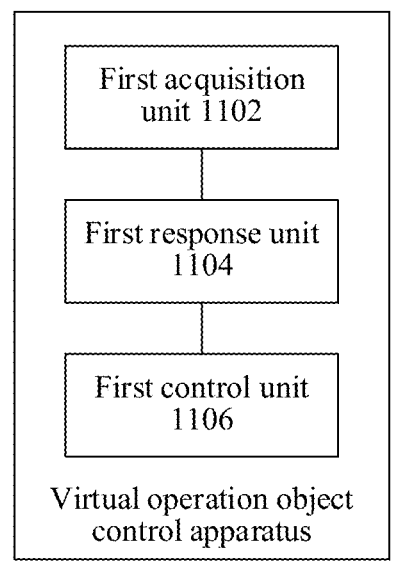
FIG. 11 is a schematic structural diagram of a virtual operation object control apparatus according to an embodiment of this disclosure.

According to another aspect of the embodiments of this disclosure, a virtual object control apparatus for implementing the virtual operation object control method is further provided. As shown in FIG. 11, the apparatus includes a first acquisition unit 1102, a first response unit 1104, and a first control unit 1106. One or more units of the apparatus can be implemented by processing circuitry, software, or a combination thereof, for example.

The first acquisition unit 1102 is configured to, when a distance between a first virtual operation object and a first virtual obstacle in a target game application is less than or equal to a first predetermined distance threshold, obtain a first virtual resource transfer operation, the first virtual operation object is located in a first virtual region in the target game application, the first virtual obstacle is in a locked state, the first virtual obstacle is set to prevent the first virtual operation object from moving to a second virtual region in the target game application when the first virtual obstacle is in the locked state;

The first response unit 1104 is configured to, in response to the first virtual resource transfer operation, transfer a first predetermined quantity of virtual resources from a virtual resource set currently possessed by the first virtual operation object, and switch a state of the first virtual obstacle from the locked state to an unlocked state, the first virtual obstacle is set to allow the first virtual operation object to move to the second virtual region when the first virtual obstacle is in the unlocked state.

The first control unit 1106 is configured to control the first virtual operation object to move from the first virtual region to the second virtual region when the first control operation is obtained.

Through an embodiment of this disclosure, in the target game application, the first virtual operation object is located in the first virtual region, and the first virtual obstacle is set in the target game application, the first virtual operation object is set to prevent the first virtual operation object from moving to the second virtual region in a case of being in the locked state, and when the distance between the first virtual operation object and the first virtual obstacle is less than or equal to the first predetermined distance threshold, if the first virtual resource transfer operation is obtained, in response to the first virtual resource transfer operation, the first predetermined quantity of virtual resources are transferred from the virtual resource set currently possessed by the first virtual operation object, and the state of the first virtual obstacle is switched from the locked state to the unlocked state, the first virtual obstacle being set to allow the first virtual operation object to move to the second virtual region when the first virtual obstacle is in the unlocked state; and the first virtual operation object can be controlled to move from the first virtual region to the second virtual region when the first control operation is obtained. Through the above technical solutions, by setting the virtual obstacle and the virtual region, and unlocking the virtual obstacle by transferring the virtual resource, the virtual operation object is controlled to move between the virtual regions. As a result, a game mode is no longer single, and the diversity of the control virtual operation object is improved.

In some embodiments, the apparatus further includes a display unit.

The display unit is configured to, when the first virtual operation object performs an attack operation on a virtual operation object of a target type, transfer a second predetermined quantity of virtual resources to the first virtual operation object; displaying a virtual identifier of the first virtual obstacle when the distance between the first virtual operation object and the first virtual obstacle is less than or equal to the first predetermined distance threshold.

The first acquisition unit is further configured to obtain a touch operation performed on the virtual identifier, where the first virtual resource transfer operation includes the touch operation.

In some embodiments, the display unit is further configured to display the virtual identifier of the first virtual obstacle when a distance between a detection frame of the first virtual operation object and a detection frame of the first virtual obstacle is less than or equal to the first predetermined distance threshold.

In some embodiments, the apparatus further includes a processing unit and a second control unit.

The processing unit is configured to, after the controlling first virtual operation object to move from the first virtual region to the second virtual region, maintain a state of the first virtual obstacle as the unlocked state when the first virtual operation object is located in the second virtual region.

The second control unit is configured to, when the state of the first virtual obstacle is the unlocked state and a second control operation is obtained, control the first virtual operation object to move from the second virtual region to the first virtual region.

In some embodiments, the apparatus further includes a switching unit, a second acquisition unit, a second response unit and a third control unit.

The switching unit is configured to, when the first virtual operation object moves from the first virtual region to the second virtual region, switch the first virtual obstacle from the unlocked state to the locked state.

The second acquisition unit is configured to, when the distance between the first virtual operation object and the first virtual obstacle is less than or equal to the first predetermined distance threshold, obtain a second virtual resource transfer operation, the first virtual operation object being located in the second virtual region, and the second virtual resource transfer operation being configured to transfer the first predetermined number of the virtual resources or a different number of virtual resources (e.g., a second predetermined number of virtual resources) from the virtual resource set currently owned by the first virtual operation object.

The second response unit is configured to, in response to the second virtual resource transfer operation, transfer a third predetermined quantity of virtual resources from the virtual resource set currently possessed by the first virtual operation object, and switch the state of the first virtual obstacle from the locked state to the unlocked state.

The third control unit is configured to control the first virtual operation object to move from the second virtual region to the first virtual region when the third control operation is obtained.

In some embodiments, the apparatus further includes a third acquisition unit, a third response unit, and a fourth control unit.

The third acquisition unit is configured to, when the first virtual operation object is located in the second virtual region, and a distance between the first virtual operation object and a second virtual obstacle is less than or equal to a second predetermined distance threshold, obtain a third virtual resource transfer operation, the second virtual obstacle is in a locked state, and the second virtual obstacle is set to prevent the first virtual operation object from moving to a third virtual region in the target game application when the second virtual obstacle is in the locked state.

The third response unit is configured to, in response to the third virtual resource transfer operation, transfer a fourth predetermined quantity of virtual resources from the virtual resource set currently possessed by the first virtual operation object, and switch a state of the second virtual obstacle from the locked state to the unlocked state, the second virtual obstacle is set to allow the first virtual operation object to move to the third virtual region when the second virtual obstacle is in the unlocked state, and the first predetermined quantity is different from the fourth predetermined quantity.

The fourth control unit is configured to control the first virtual operation object to move from the second virtual region to the third virtual region when the fourth control operation is obtained.

In some embodiments, the first virtual obstacle and the second virtual obstacle are different virtual obstacles.

It is noted that one or more modules, submodules, and/or units in the present disclosure can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 12:
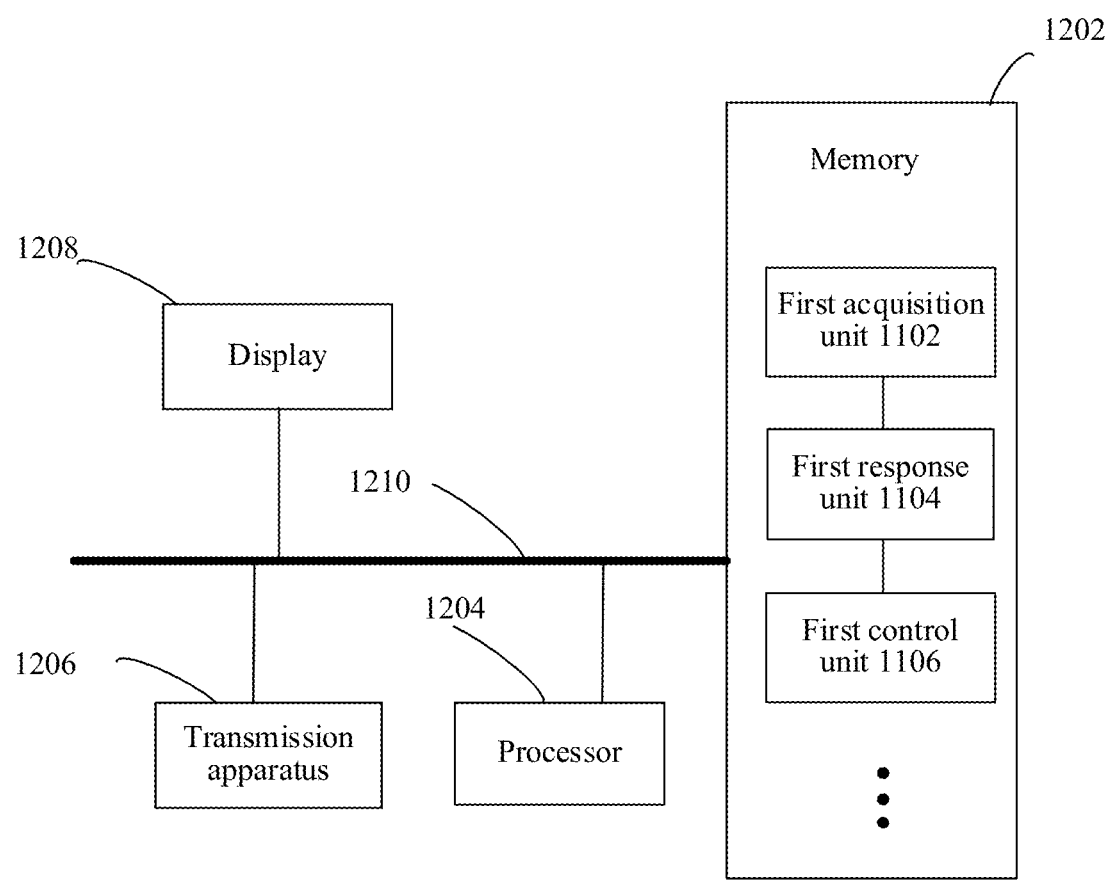
FIG. 12 is a schematic structural diagram of an electronic device according to an embodiment of this disclosure.

According to still another aspect of the embodiments of this disclosure, an electronic device for performing the foregoing virtual operation object control method is further provided. As shown in FIG. 12, the electronic device includes a memory 1202 and a processor 1204. The memory 1202 stores a computer program. The processor 1204 is configured to perform the steps in any one of the foregoing method embodiments by executing the computer program.

In this embodiment, the electronic device may be located in at least one of a plurality of network devices in a computer network.

In this embodiment, the processor may be configured to perform the following steps by using the computer program:

In a first step, un a case that a distance between a first virtual operation object and a first virtual obstacle in a target game application is less than or equal to a first predetermined distance threshold, a first virtual resource transfer operation is obtained, the first virtual operation object is located in a first virtual region in the target game application, the first virtual obstacle is in a locked state, the first virtual obstacle is set to prevent the first virtual operation object from moving to a second virtual region in the target game application when the first virtual obstacle is in the locked state, and the first virtual resource transfer operation is configured to transfer a first predetermined quantity of virtual resources from a virtual resource set currently owned by the first virtual operation object.

In a second step, in response to the first virtual resource transfer operation, the first predetermined quantity of virtual resources are transferred from the virtual resource set currently possessed by the first virtual operation object, and a state of the first virtual obstacle is switched from the locked state to an unlocked state, the first virtual obstacle is set to allow the first virtual operation object to move to the second virtual region when the first virtual obstacle is in the unlocked state.

In a third step, the first virtual operation object is controlled to move from the first virtual region to the second virtual region when the first control operation is obtained.

A person of ordinary skill in the art may understand that, the structure shown in FIG. 12 is only exemplary. The electronic device may be a terminal device such as a smartphone (such as an Android mobile phone or an iOS mobile phone), a tablet computer, a palmtop computer, a mobile Internet device (MID), or a PAD. FIG. 12 does not constitute a limitation on the structure of the electronic device. For example, the electronic device may further include more or fewer components (such as a network interface) than those shown in FIG. 12, or may have a configuration different from that shown in FIG. 12.

The memory 1202 may be configured to store a software program and a module, for example, a program instruction/module corresponding to the virtual operation object control method and apparatus in the embodiments of this disclosure. Processing circuitry, such as the processor 1204, performs various functional applications and data processing that is, implements the foregoing virtual operation object control method, by running the software program and the module stored in the memory 1202. The memory 1202 may include a high-speed random memory, and may also include a non-volatile memory such as one or more magnetic storage apparatuses, flash memory, or other non-volatile solid-state memory. In some embodiments, the memory 1202 may include memories remotely disposed with respect to the processor 1204, and the remote memories may be connected to a terminal through a network. The foregoing examples of the network include, but are not limited to, the Internet, an intranet, a local area network, a mobile communication network, and a combination thereof. The memory 1202 may be, but is not limited to, configured to store information such as the virtual resource set currently possessed by the first virtual operation object. In an example, As shown in FIG. 12, the memory 1202 may include, but is not limited to, a first acquisition unit 1102, a first response unit 1104, and a first control unit 1106 in the virtual operation object control apparatus. In addition, the memory may also include, but is not limited to, other modules and units in the virtual operation object control apparatus, and details are not elaborated in this example.

A transmission apparatus 1206 is configured to receive or transmit data through a network. The foregoing network may include a wired network and a wireless network. In an example, the transmission apparatus 1206 includes a network interface controller (NIC). The NIC may be connected to another network device and a router by using a network cable, so as to be capable of communicating with the Internet or a local area network. In an example, the transmission apparatus 1206 is a radio frequency (RF) module, and is configured to wirelessly communicate with the Internet.

In addition, the electronic device further includes: a display 1208, configured to display the virtual identifier of the first virtual obstacle; and a connection bus 1210, configured to connect various module components in the electronic device.

According to still another aspect of the embodiments of this disclosure, a computer-readable storage medium (e.g., a non-transitory computer-readable storage medium) is further provided. The computer-readable storage medium stores a computer program, the computer program being configured to perform steps in any one of the foregoing method embodiments when being run.

In this embodiment, the computer-readable storage medium may be configured to store a computer program configured to perform the following steps:

In a first step, a first virtual resource transfer operation is acquired when a distance between a first virtual operation object and a first virtual obstacle in a target game application is less than or equal to a first predetermined distance threshold, the first virtual operation object is located in a first virtual region in the target game application, the first virtual obstacle is in a locked state, the first virtual obstacle is set to prevent the first virtual operation object from moving to a second virtual region in the target game application when the first virtual obstacle is in the locked state, and the first virtual resource transfer operation is configured to transfer a first predetermined quantity of virtual resources from a virtual resource set currently owned by the first virtual operation object.

In a second step, in response to the first virtual resource transfer operation, the first predetermined quantity of the virtual resources is transferred from the virtual resource set currently possessed by the first virtual operation object, and a state of the first virtual obstacle is switched from the locked state to an unlocked state, the first virtual obstacle is set to allow the first virtual operation object to move to the second virtual region when the first virtual obstacle is in the unlocked state.

In a third step, the first virtual operation object is controlled to move from the first virtual region to the second virtual region when the first control operation is obtained.

In this embodiment, all or some of the steps of the methods in the foregoing embodiments may be implemented by a program instructing relevant hardware of the terminal device. The program may be stored in a computer-readable storage medium. The storage medium (e.g., a non-transitory computer-readable storage medium) may include a flash disk, a read-only memory (ROM), a random access memory (RAM), a magnetic disk, an optical disk, and the like.

The sequence numbers of the foregoing embodiments of this disclosure are merely for description purposes, and are not intended to indicate the preference among the embodiments.

In a case that the integrated unit in the foregoing embodiments is implemented in the form of a software function unit and sold or used as an independent product, the integrated unit may be stored in the foregoing computer-readable storage medium. Based on such an understanding, the technical solutions of the embodiments of this disclosure may be implemented in a form of a software product. The computer software product is stored in a storage medium and includes several instructions for instructing one or more computer devices (which may be a PC, a server, a network device, or the like) to perform all or some of steps of the methods in the embodiments of this disclosure.

In the foregoing embodiments of this disclosure, description of each embodiment focuses on a different part, and for parts that are not described in detail in one embodiment, reference may be made to the related description of other embodiments.

In the several embodiments provided in this disclosure, it is to be understood that the disclosed client may be implemented in other manners. The foregoing described apparatus embodiments are merely examples. For example, the unit division is merely logical function division and there may be other division manners in other implementations. For example, a plurality of units or components may be combined or integrated into another system, or some features may be omitted or not performed. In addition, the coupling, or direct coupling, or communication connection between the displayed or discussed components may be the indirect coupling or communication connection by using some interfaces, units, or modules, and may be electrical or of other forms.

The units described as separate parts may or may not be physically separate, and components displayed as units may or may not be physical units, that is, may be located in one position, or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this disclosure. A person of ordinary skill in the art may make some improvements and polishing without departing from the principle of this disclosure and the improvements and polishing shall fall within the protection scope of this disclosure.

What is claimed is:

1. A method for virtual object control in a game application, the method comprising:
   controlling a first virtual object to perform attack operations on a plurality of second virtual objects in one or more unlocked virtual regions based on user input information, the plurality of second virtual objects being continuously generated;
   accumulating virtual resources into a virtual resource set of the first virtual object, the virtual resources being generated for each of the attack operations performed on the second virtual objects in the one or more unlocked virtual regions;
   detecting, by processing circuitry of an electronic device that executes the game application, a first virtual resource transfer operation when (i) the accumulated virtual resources are greater than or equal to an unlock threshold and (ii) a distance between a first detection indicator attached to the first virtual object and a second detection indicator of a first virtual obstacle is less than or equal to a first predetermined distance threshold,
   the first virtual being located in a first virtual region of the one or more unlocked virtual regions in the game application, the first virtual obstacle being in a first locked state that prevents the first virtual object from entering a second virtual region in the game application;
   in response to the first virtual resource transfer operation, switching, by the processing circuitry of the electronic device, the first virtual obstacle from the first locked state to a first unlocked state that allows the first virtual object to enter the second virtual region based on a reduction of a first predetermined quantity of the virtual resources from the virtual resource set of the first virtual object; and
   controlling, by the processing circuitry of the electronic device, the first virtual object to move from the first virtual region into the second virtual region when a first control operation is detected.

2. The method according to claim 1, further comprising:
   in response to an attack operation on a virtual object of a specific type, adding a second predetermined quantity of virtual resources to the virtual resource set of the first virtual object.

3. The method according to claim 1, wherein the detecting the first virtual resource transfer operation further comprises:
   when the distance between the first virtual object and the first virtual obstacle is less than or equal to the first predetermined distance threshold, displaying a virtual identifier of the first virtual obstacle and an amount of the unlock threshold in association with the virtual identifier, and
   detecting the first virtual resource transfer operation based on an operation on the virtual identifier by a user.

4. The method according to claim 3, wherein the displaying the virtual identifier of the first virtual obstacle comprises:
   detecting that a distance between a first detection frame of the first virtual object and a second detection frame of the first virtual obstacle is less than or equal to the first predetermined distance threshold; and
   displaying the virtual identifier of the first virtual obstacle and the amount of the unlock threshold in response to the detection that the distance between the first detection frame and the second detection frame is less than or equal to the first predetermined distance threshold.

5. The method according to claim 1 further comprising:
when the first virtual object is located in the second virtual region, maintaining the first virtual obstacle in the first unlocked state; and
when the first virtual obstacle is in the first unlocked state and a second control operation is detected, controlling the first virtual object to move from the second virtual region into the first virtual region.

6. The method according to claim 1, further comprising:
in response to the first virtual object moving from the first virtual region into the second virtual region, switching the first virtual obstacle from the first unlocked state to the first locked state;
detecting a second virtual resource transfer operation when the distance between the first virtual object in the second virtual region and the first virtual obstacle is less than or equal to the first predetermined distance threshold;
in response to the second virtual resource transfer operation, switching the first virtual obstacle from the first locked state to the first unlocked state based on a reduction of a third predetermined quantity of virtual resources from the virtual resource set of the first virtual object; and
controlling the first virtual object to move from the second virtual region to the first virtual region when a third control operation is detected.

7. The method according to claim 1, further comprising:
detecting a third virtual resource transfer operation when the first virtual object is located in the second virtual region, and a distance between the first virtual object and a second virtual obstacle is less than or equal to a second predetermined distance threshold, the second virtual obstacle being in a second locked state that prevents the first virtual object from entering a third virtual region in the game application;
in response to the third virtual resource transfer operation, switching the second virtual obstacle from the second locked state to a second unlocked state that allows the first virtual object to enter the third virtual region based on a reduction of a fourth predetermined quantity of virtual resources from the virtual resource set possessed by the first virtual object; and
controlling the first virtual object to move from the second virtual region into the third virtual region when a fourth control operation is detected.

8. An apparatus, comprising processing circuitry configured to:
control a first virtual object in a game application to perform attack operations on a plurality of second virtual objects in one or more unlocked virtual regions based on user input information, the plurality of second virtual objects being continuously generated;
accumulate virtual resources into a virtual resource set of the first virtual object, the virtual resources being generated for each of the attack operations performed on the second virtual objects in the one or more unlocked virtual regions;
detect a first virtual resource transfer operation when (i) the accumulated virtual resources are greater than or equal to an unlock threshold and (ii) a distance between a first detection indicator attached to the first virtual object and a second detection indicator of a first virtual obstacle is less than or equal to a first predetermined distance threshold, the first virtual object being located in a first virtual region of the one or more unlocked virtual regions in the game application, the first virtual obstacle being in a first locked state that prevents the first virtual object from entering a second virtual region in the game application;
in response to the first virtual resource transfer operation, switch the first virtual obstacle from the first locked state to a first unlocked state that allows the first virtual object to enter the second virtual region based on a reduction of a first predetermined quantity of virtual resources from a virtual resource set of the first virtual object; and
control the first virtual object to move from the first virtual region into the second virtual region when a first control operation is detected.

9. The apparatus according to claim 8, wherein the processing circuitry is further configured to:
in response to an attack operation on a virtual object of a specific type, add a second predetermined quantity of virtual resources to the virtual resource set of the first virtual object.

10. The apparatus according to claim 9, wherein the processing circuitry is further configured to:
when the distance between the first virtual object and the first virtual obstacle is less than or equal to the first predetermined distance threshold, display a virtual identifier of the first virtual obstacle and an amount of the unlock threshold in association with the virtual identifier; and
detect the first virtual resource transfer operation based on an operation on the virtual identifier by a user.

11. The apparatus according to claim 10, wherein the processing circuitry is configured to:
detect that a distance between a first detection frame of the first virtual object and a second detection frame of the first virtual obstacle is less than or equal to the first predetermined distance threshold; and
display, via a display, the virtual identifier of the first virtual obstacle and the amount of the unlock threshold in response to the detection that the distance between the first detection frame and the second detection frame is less than or equal to the first predetermined distance threshold.

12. The apparatus according to claim 8, wherein the processing circuitry is configured to:
when the first virtual object is located in the second virtual region, maintain the first virtual obstacle in the first unlocked state; and
when the first virtual obstacle is in the first unlocked state and a second control operation is detected, control the first virtual object to move from the second virtual region into the first virtual region.

13. The apparatus according to claim 8, wherein the processing circuitry is configured to:
in response to the first virtual object moving from the first virtual region into the second virtual region, switch the first virtual obstacle from the first unlocked state to the first locked state;
detect a second virtual resource transfer operation when the distance between the first virtual object in the second virtual region and the first virtual obstacle is less than or equal to the first predetermined distance threshold;
in response to the second virtual resource transfer operation, switch the first virtual obstacle from the first locked state to the first unlocked state based on a reduction of a third predetermined quantity of virtual resources from the virtual resource set possessed by the first virtual object; and control the first virtual object to move from the second virtual region to the first virtual region when a third control operation is detected.

14. The apparatus according to claim 8, wherein the processing circuitry is configured to:

detect a third virtual resource transfer operation when the first virtual object is located in the second virtual region, and a distance between the first virtual object and a second virtual obstacle is less than or equal to a second predetermined distance threshold, the second virtual obstacle being in a second locked state that prevents the first virtual object from entering a third virtual region in the game application;

in response to the third virtual resource transfer operation, switch the second virtual obstacle from the second locked state to a second unlocked state that allows the first virtual object to enter the third virtual region based on a reduction of a fourth predetermined quantity of virtual resources from the virtual resource set possessed by the first virtual object; and control the first virtual object to move from the second virtual region into the third virtual region when a fourth control operation is detected.

15. A non-transitory computer-readable medium storing instructions for a game application which when executed by a computer cause the computer to perform:

controlling a first virtual object to perform attack operations on a plurality of second virtual objects in one or more unlocked virtual regions based on user input information, the plurality of second virtual objects continuously generated;

accumulating virtual resources into a virtual resource set of the first virtual object, the virtual resources being generated for each of the attack operations performed on the second virtual objects in the one or more unlocked virtual regions;

detecting a first virtual resource transfer operation when (i) the accumulated virtual resources are greater than or equal to an unlock threshold and (ii) a distance between a first detection indicator attached to the first virtual object and a second detection indicator of a first virtual obstacle is less than or equal to a first predetermined distance threshold, the first virtual object being located in a first virtual region of the one or more unlocked virtual regions in the game application, the first virtual obstacle being in a first locked state that prevents the first virtual object from entering a second virtual region in the game application;

in response to the first virtual resource transfer operation, switching the first virtual obstacle from the first locked state to a first unlocked state that allows the first virtual object to enter the second virtual region based on a reduction of a first predetermined quantity of the virtual resources from the virtual resource set of the first virtual object; and controlling the first virtual object to move from the first virtual region into the second virtual region when a first control operation is detected.

16. The non-transitory computer-readable medium according to claim 15, wherein the instructions cause the computer perform:

in response to an attack operation on a virtual object of a specific type, adding a second predetermined quantity of virtual resources to the virtual resource set of the first virtual object.

17. The non-transitory computer-readable medium according to claim 15, wherein the instructions cause the computer perform:

when the distance between the first virtual object and the first virtual obstacle is less than or equal to the first predetermined distance threshold, displaying a virtual identifier of the first virtual obstacle and an amount of the unlock threshold in association with the virtual identifier; and detecting the first virtual resource transfer operation based on an operation on the virtual identifier by a user.

18. The non-transitory computer-readable medium according to claim 17, wherein the instructions cause the computer perform:

detecting that a distance between a first detection frame of the first virtual object and a second detection frame of the first virtual obstacle is less than or equal to the first predetermined distance threshold; and displaying the virtual identifier of the first virtual obstacle and the amount of the unlock threshold in response to the detection that the distance between the first detection frame and the second detection frame is less than or equal to the first predetermined distance threshold.

19. The non-transitory computer-readable medium according to claim 15, wherein the instructions cause the computer perform:

when the first virtual object is located in the second virtual region, maintaining the first virtual obstacle in the first unlocked state; and when the first virtual obstacle is in the first unlocked state and a second control operation is detected, controlling the first virtual object to move from the second virtual region into the first virtual region.

20. The non-transitory computer-readable medium according to claim 15, wherein the instructions cause the computer perform:

in response to the first virtual object moving from the first virtual region into the second virtual region, switching the first virtual obstacle from the first unlocked state to the first locked state;

detecting a second virtual resource transfer operation when the distance between the first virtual object in the second virtual region and the first virtual obstacle is less than or equal to the first predetermined distance threshold;

in response to the second virtual resource transfer operation, switching the first virtual obstacle from the first locked state to the first unlocked state based on a reduction of a third predetermined quantity of virtual resources from the virtual resource set possessed by the first virtual object; and controlling the first virtual object to move from the second virtual region to the first virtual region when a third control operation is detected.

* * * * *